United States Patent [19]

Lewis et al.

[11] 4,046,540

[45] Sept. 6, 1977

[54] GLASS INJECTION MOULDING PROCESS

[75] Inventors: Cyril John Lewis; Neil Carter; Neil Hunter Ray, all of Runcorn, England

[73] Assignee: Imperial Chemical Industries Limited, London, England

[21] Appl. No.: 586,918

[22] Filed: June 16, 1975

Related U.S. Application Data

[63] Continuation of Ser. No. 436,350, Jan. 24, 1974, abandoned.

[30] Foreign Application Priority Data

Feb. 19, 1973 United Kingdom ............... 7992/73
Apr. 12, 1973 United Kingdom ............... 17615/73

[51] Int. Cl.$^2$ .............................................. C03B 5/00
[52] U.S. Cl. ........................................ 65/18; 65/32; 65/122; 65/134; 65/144
[58] Field of Search .................. 65/18, 32, 122, 134, 65/144

[56] References Cited

U.S. PATENT DOCUMENTS

| 1,536,821 | 12/1975 | Devers | 65/2 |
| 3,098,699 | 7/1963 | Roy | 264/332 |
| 3,732,181 | 5/1973 | Ray et al. | 260/41 B |
| 3,804,645 | 4/1974 | Lewis et al. | 106/50 |
| 3,935,018 | 1/1976 | Ray et al. | 106/47 R |

FOREIGN PATENT DOCUMENTS

| 716,365 | 6/1968 | Belgium |
| 836,362 | 10/1938 | France |
| 704,252 | 3/1941 | Germany |
| 1,571,174 | 1/1965 | Germany |
| 1,910,921 | 8/1963 | Germany |
| 1,984,514 | 11/1967 | Germany |
| 157,520 | 12/1939 | Germany |
| 1,371,377 | 10/1974 | United Kingdom |
| 1,387,301 | 3/1975 | United Kingdom |

*Primary Examiner*—Arthur D. Kellogg
*Attorney, Agent, or Firm*—Cushman, Darby & Cushman

[57] ABSTRACT

The production of shaped glass articles is undertaken by an injection moulding process by charging a particulate inorganic glass having a transformation temperature of not greater than 300° C to an injection moulding machine; by converting the glass to a molten state in the barrel of the machine; and by injecting the molten glass into a mould on the machine.

8 Claims, No Drawings

GLASS INJECTION MOULDING PROCESS

This is a continuation, of application Ser. No. 436,350 filed Jan. 24, 1974, now abandoned.

This invention relates to a glass moulding process and more particularly to a process for the production of shaped glass articles by injection moulding.

Moulded glass articles fabricated from silicate glasses are generally moulded by a process in which a gob of molten glass is charged to an open mould which is then closed under pressure, or into which a plunger is forced. In this way moulded articles, for example, tumblers, dishes, ash trays and lamp lenses may be produced. Such articles may be made in an automatic press in which a circular table carrying a number of moulds is rotated stepwise to bring each mould in turn below a charging device, then to a pressing station, and, after a sufficient interval of time to allow cooling of the glass in the mould to take place, to a take-off point. The temperature of the glass during the moulding process is typically in the range 800° C to 1000° C.

The high temperature of the molten silicate glass gives rise to a number of problems. The material of which the moulds are constructed is subject to corrosion at high temperatures and accurate dimensioning is made difficult by thermal expansion effects. A considerable time must be allowed to elapse before the article which has been moulded has cooled sufficiently to be self-supporting on removal from the mould, necessitating the provision of a large number of moulds on a rotating table as described above. Even then, it is generally necessary to remove the article from the mould at a temperature at which any sharp edges produced in the moulding will tend to become rounded off, thus making precision moulding extremely difficult. For example, car head-lamp lenses incorporate a number of prisms, and when these articles are moulded from silicate glass in the conventional way, the edges of the prisms are rounded and the optical efficiency of the system is reduced. Furthermore, the large temperature drop from the molten state to ambient temperature causes severe stresses to be set up in the glass article, which must be relieved by a long annealing process.

Organic thermoplastic materials are generally moulded by injection moulding in which granules of the material are charged to the heated barrel of an injection moulding machine and converted to a molten state, optionally with the aid of a mixing screw, and the melt is then forced at a pressure of up to approximately 20,000 lb/sq.in$^{-1}$ through narrow channels into a relatively cool mould in which it quickly solidifies. The mould is then opened without further cooling and the moulded article removed. Because of the relatively low softening points of organic thermoplastic materials, short cycle times may be achieved and the use of a series of moulds is not necessary. Precision mouldings with sharp edges may be obtained. For optical applications injection moulded articles of transparent thermoplastic materials, for example polymethylmethacrylate, may be used, but these have certain disadvantages, notably poor resistance to heat, solvents and scratches. Hitherto, glasses such as silicate glasses have not been moulded by injection moulding as the temperatures which it would have been necessary to use in order to mould satisfactorily are considerably greater than the maximum temperature of operation of conventional injection moulding machines which are used in plastics processing. Furthermore, the temperatures which it would have been necessary to use are such that an undesirable amount of corrosion of the materials of construction of the injection moulding machine would have occurred.

We have now found that glasses may be moulded by injection molding in plastics injection moulding machines to produce articles having accurate dimensions and sharp edges provided the glass which is used in the process has a relatively low softening point. The injection moulding process is particularly suitable for the production of large numbers of moulded glass articles in long production runs as the moulded articles may be removed from the moulds shortly after moulding and the cycle time of the injection moulding process may be made relatively short.

The present invention provides a process for the production of shaped glass articles which comprises charging a particulate inorganic glass having a transformation temperature of not greater than 300° C to an injection moulding machine, converting the glass to a molten state in the barrel of the machine, and injecting the molten glass into a mould on the machine.

The transformation temperature of the glass is determined by differential calorimetry using the DuPont Differential Thermal Analyser. A sample of the powdered glass and a reference sample of pure powdered silica are heated at a programmed rate of temperature increase of 20° C/min, and a graph is obtained of the temperature difference between the samples plotted against the temperature of the reference sample. This curve typically has a linear portion of small slope and a second linear portion of larger negative slope at higher temperatures. The two linear portions are produced so that they intersect, and the transformation temperature is taken as the temperature corresponding to the point of intersection.

In the process of the present invention it is preferred to use a glass having a transformation temperature of not greater than 250° C as such a glass is more readily moulded by injection moulding.

The term "glass" includes partially-devitrified glass, glass/ceramic comprising crystalline inclusions in a glass matrix, and mixtures of glass with inert fillers, e.g. silica or alumina. Suitably, the glass which is used is an inorganic oxide glass and preferably the glass is a phosphate glass, that is, a glass having a $P_2O_5$ content of 25 mole % or greater, as we find in general that such phosphate glasses having transformation temperatures of not greater than 300° C, and preferably not greater than 250° C, have a viscosity-temperature relationship which makes them particularly suitable for use in injection moulding. Preferred phosphate glasses have a $P_2O_5$ content of at least 50 mole % and more preferably at least 60 mole %. Preferably, the $P_2O_5$ content does not exceed 75 mole %.

Phosphate glasses suitable for use in the process of the present invention include any of those disclosed in copending British Patent Applications Nos. 18481/70, 48104/71, 48105/71, 6694/72 and 19560/72, now published, respectively, as Belgian Pat. Nos. 765908, 789866, 789867, 795152 and 798480.

The phosphate glass may contain a network-forming oxide, for example $B_2O_3$, and one or more other oxides. For example, the glass may contain one or more alkali metal oxides, e.g. $Na_2O$ and $Li_2O$, and/or one or more alkaline earth oxides, e.g. CaO, MgO, and BaO. Where the moulded glass article is to be used in an optical application, for example, as a lens, it is useful to be able to vary and control the refractive index of the glass. This may be achieved by including PbO and/or $Sb_2O_3$ in the glass. The glass may also contain one or more transition metal oxides and/or zinc oxide. A particularly suitable glass for use in the injection moulding process is a glass having a transformation temperature of not greater than 300° C and a composition (in mole %) of $B_2O_3$ 1.2 to 3.5, $P_2O_5$ 50 to 72, PbO 0 to 30, transition metal oxide 0 to 5, and at least 5 mole %, and preferably at least 10 mole % of one or more oxides selected from alkali metal oxides, alkaline earth oxides and zinc oxide. Particularly preferred glass compositions for use in the production of optical articles, e.g. lenses, by injection-moulding have compositions within the range (in mole %).

$P_2O_5$ : 58–65
$B_2O_3$ : 1.2–3.5
PbO : 4–6
$Na_2O$ : 12–20
the balance being oxides selected from $Li_2O$, CaO and MgO and which have refractive indices in the range 1.51–1.53, i.e. close to that of white ophthalmic crown glass.

Compositions comprising glass having a transformation temperature of not greater than 300° C and one or more other inorganic components may be moulded by the process of the present invention. Such compositions include mixtures of glass and inorganic fillers disclosed in our copending application British Patent Application No. 48103/71 (Belgian Pat. No. 790097).

The injection moulding process of the present invention may be effected in a conventional plastics processing injection moulding machine. Basically, the injection moulding machine comprises a barrel which is equipped with an entry port, e.g. a hopper, through which particulate glass may be charged, and heating means by which the glass may be converted to a molten state when in the barrel, means for moving the glass along the barrel and into the mould, e.g. a screw or plunger, and a mould, which may have a single cavity or a plurality of cavities. The injection moulding machine may be a single screw or double screw machine and it may be a two-shot machine in which charges of molten glass of different compositions may be forced into the mould simultaneously or sequentially.

The glass fed to the injection moulding machine, for example, via a hopper, is preferably in the form of coarse particles of approximately 5–8 mesh size, although finer and/or coarser particles may also be used. The coarse particulate glass obtained by quenching a stream of molten glass in water may be suitable for use in injection-moulding without further grinding. It may however, be desirable to dry the glass thoroughly before moulding, whether or not water-quenched glass is used. This is particularly desirable for ultraphosphate glasses comprising 66 mole % or more of $P_2O_5$.

The selection of suitable conditions for injection-moulding of glass by the process of the present invention may be made by routine experimentation and it will present no problems to the man skilled in the art of injection-moulding of plastics materials. As an indication of suitable processing conditions, the temperature of at least that part of the barrel of the injection-moulding machine in which the glass is converted to a molten state is preferably in the range 150° to 250° C above the transformation temperature of the glass which is being moulded although a temperature outside this range may be used. However, in order to decrease corrosion of the barrel by the molten glass it is desirable to operate at a barrel temperature which is no higher than the minimum temperature required to produce a molten glass having a viscosity suitable for injection-moulding and in general this temperature is in a range 150° to 200° C above the transformation temperature of the glass which is being moulded.

Commercially available plastics injection moulding machines are normally capable of providing barrel temperatures of up to at least 400° C and in order to provide higher barrel temperatures they may readily be modified, for example, by provision of suitable heaters to give barrel temperatures as high as 500° to 600° C. However, at temperatures approaching 600° C injection pressures used in the moulding process may have to be reduced in order to prevent an undesirable amount of yielding of the material of which the barrel is constructed. A practical upper limit of the barrel temperature is in the region of 600° C and it will be appreciated that even with this limitation glass may be injection moulded by the process of the present invention provided the transformation temperature of the glass it not greater than 300° C whereas because of this limitation on barrel temperature plastics injection moulding machine would be quite incapable of moulding normal silicate glasses.

If it is desired to produce glass articles free of crystalline inclusions the barrel temperature should be kept as remote as possible from that at which the maximum rate of devitrification takes place. When the working temperature is below the temperature at which devitrification is fastest, the barrel temperature should be kept as low as possible, but when the working temperature is above the temperature at which devitrification is fastest the barrel temperature should be as high as practicable, and if possible above the crystalline melting point. On the other hand, if it is desired to produce moulded glass-ceramic articles by partial devitrification of the glass, it may be desirable to use higher or lower barrel temperatures as the case may be. Different glass compositions give different rates of devitrification and suitable moulding conditions must be chosen for each glass composition by routine experimentation.

It is desirable that the injection moulding machine includes a shut-off nozzle positioned between the barrel and the mould so that the barrel may be charged with glass against a back pressure in order to eliminate bubbles. The shut-off nozzle may be controlled by springs but it has been found that a sliding shut-off nozzle may operate more satisfactorily especially at higher temperatures.

It is also desirable that the mould of the injection moulding machine should be operated at an elevated temperature. If the mould is too cold then thermal shock may crack the glass moulding during the moulding process whereas if it is too hot the moulded article may tend to stick to the mould and any sharp edges in the moulding may tend to become rounded off. Preferably, the mould temperature is below the transformation temperature of the glass being moulded and is suitably at a temperature of no more than 100° C, and preferably no more than 50° C below the transformation temperature of the glass. It may also be desirable to use moulds with heated runners in order to improve flow of glass into the mould.

The moulded articles may be removed from the mould by conventional means, for example, by opening the mould and pushing out the moulded glass articles.

The invention is illustrated by the following Examples in which glass is injection moulded on a 2 oz Stübbe injection moulding machine (SKM 50/35) having the following characteristics.

Screw diameter: 30 cm
Maximum injection volume: 57 cm$^3$
Screw speed: 40 to 300 rpm
Maximum injection pressure: 1000 kg cm$^{-2}$
Mould locking force: 35 metric tons
Maximum barrel temperature: 400° C

EXAMPLE 1

An inorganic oxide glass having a transformation temperature of 125° C and a mole % composition of $P_2O_5$ 71.8, $B_2O_3$ 2.57, $Li_2O$ 10.25, $Na_2O$ 10.25, BaO 5.13 was ground to 5 to 8 mesh size and was charged to the injection moulding machine and the glass was injection moulded into a mould having three cavities of dimensions 2½ in × ½ in × ¼ in. The 2½ in × ½ in × ¼ in bars removed from the mould had sharp edges and had a shrinkage of less than 0.1%. The moulded bars did not show any visible crystalline inclusions.

In a further experiment the above procedure was repeated except that the mould had a single cavity of diameter 4½ in and a depth of ⅛ in. The 4½ in diameter × ⅛ in thick disc removed from the mould had sharp edges and a shrinkage of less than 0.1%. The discs did not show any visible crystalline inclusions. In both of the above experiments the following operating conditions were used.

Barrel temperature: 300° to 320° C
Mould temperature: 90° C
Injection pressure 1000 kg cm$^{-2}$
Mould locking pressure: 15 kg cm$^{-2}$

EXAMPLE 2

The procedure of the further experiment of Example 1 was followed to produce 4½ in diameter × ⅛ in thick discs except that the inorganic oxide glass which was used had a transformation temperature of 206° C and a mole %. composition of $P_2O_5$ 55.9, PbO 20.6, $K_2O$ 18.7, MgO 2.4 and $B_2O_3$ 2.4 and the operating conditions used were as follows.

Barrel temperature: 380° C
Mould temperature: 140° C
Injection pressure: 1000 kg cm$^{-2}$
Mould locking pressure: 15 kg cm$^{-2}$ The discs removed from the mould had sharp edges, were translucent in appearance and contained some visible crystalline inclusions in a glassy matrix.

EXAMPLE 3

The procedure of Example 1 was followed to produce moulded 2½ in × ½ in × ¼ in bars except that the injection moulder which was used had been modified so that a maximum barrel temperature of 600° C could be achieved. The inorganic oxide glass which was injection moulded had a mesh size of 5 to 25, a transformation temperature of 240° C, and a mole % composition of $P_2O_5$ 62.8, $Li_2O$ 7.62, $Na_2O$ 13.5, MgO 4.5, CaO 4.5, PbO 4.9 and $B_2O_3$ 2.25. The moulded bars had sharp edges and did not show any visible crystalline inclusions.

The operating conditions used were as follows.
Barrel temperature: 500° C
Mould temperature: 200° C
Injection pressure: 1000 kg cm$^{-2}$
Mould locking pressure: 15 kg cm$^{-2}$

EXAMPLE 4

The modified injection moulder as used in Example 3 was used to produce moulded 2½ in × ½ in × ¼ in bars using an inorganic oxide glass having a transformation temperature of 270° C and a mole % composition of $P_2O_5$ 63.1, $Li_2O$ 7.6, $Na_2O$ 13.5, MgO 4.5, CaO 4.5, PbO 4.5 and $B_2O_3$ 2.3. The glass had previously been ground to a 5 to 25 mesh size and the following operating conditions were used.

Barrel temperature: 550° C
Mould temperature: 260° C
Injection pressure: 1000 kg cm$^{-2}$
Mould locking pressure: 15 kg cm$^{-2}$ The moulded bars had sharp edges and did not show any visible crystalline inclusions.

What we claim is:

1. A process for the production of shaped glass articles which comprises charging a particulate phosphate glass having a $P_2O_5$ content of 25 mole % or greater having a transformation temperature of not greater than 300° C to an injection moulding machine, converting the glass to the molten state in the barrel of the machine, the barrel temperature being in the range from the temperature at which the glass becomes molten up to a temperature of 600° C injecting the molten glass into a mould on the machine, the temperature of the mould being maintained at a temperature in the range from the transformation temperature to 100° C below the transformation of said glass; and removing the molded article from said mould.

2. A process as claimed in claim 1 in which the glass has a transformation temperature of not greater than 250° C.

3. A process as claimed in claim 1 in which the glass is an inorganic oxide glass.

4. A process as claimed in claim 1 in which the phosphate glass comprises at least 50 mole % of $P_2O_5$.

5. A process as claimed in claim 4 in which the phosphate glass comprises at least 60 mole % of $P_2O_5$.

6. A process as claimed in claim 1 in which at least part of the barrel of the injection moulding machine is at a temperature in the range 150° to 250° C above the transformation temperature of the glass which is being moulded.

7. A process as claimed in claim 6 in which at least part of the barrel of the injection moulding machine is at a temperature in the range 150° to 200° C above the transformation temperature of the glass which is being moulded.

8. The process of claim 1 which further includes the step of removing a shaped article from the mould.

* * * * *